Aug. 14, 1962 — C. F. NEWBURG — 3,049,235
SCREENING PROCESS FOR VIBRATORY SCREENS
Filed May 27, 1958 — 2 Sheets-Sheet 1

INVENTOR.
CHARLES F. NEWBURG,
BY Parker and Carter
ATTORNEYS.

Aug. 14, 1962 C. F. NEWBURG 3,049,235
SCREENING PROCESS FOR VIBRATORY SCREENS
Filed May 27, 1958 2 Sheets-Sheet 2

INVENTOR.
CHARLES F. NEWBURG,
BY
Parker and Carter
ATTORNEYS.

3,049,235
SCREENING PROCESS FOR VIBRATORY SCREENS
Charles F. Newburg, Chicago, Ill., assignor to Novo Industrial Corporation, a corporation of New York
Filed May 27, 1958, Ser. No. 738,169
7 Claims. (Cl. 209—346)

This invention is in the field of screening or separating devices and is a new and improved method of operating a tensioned screen, either wet or dry, so that a maximum screening efficiency will be obtained without clogging or blinding.

A primary object of my invention is a new and improved method of operating a vibratory screen to effect a desired separation of a particular material to reduce the blinding tendency of the screen deck.

Another object is a method of operating a vibratory screen for more accurate results in the desired separation.

Another object is a screening process which is more efficient than previous methods.

Another object is a method of operating a screen to increase the actual opening size in the screen without increasing the effective size of the openings.

Another object is a new screening process which reduces or prevents clogging or blinding when screening wet material.

Figure 1:
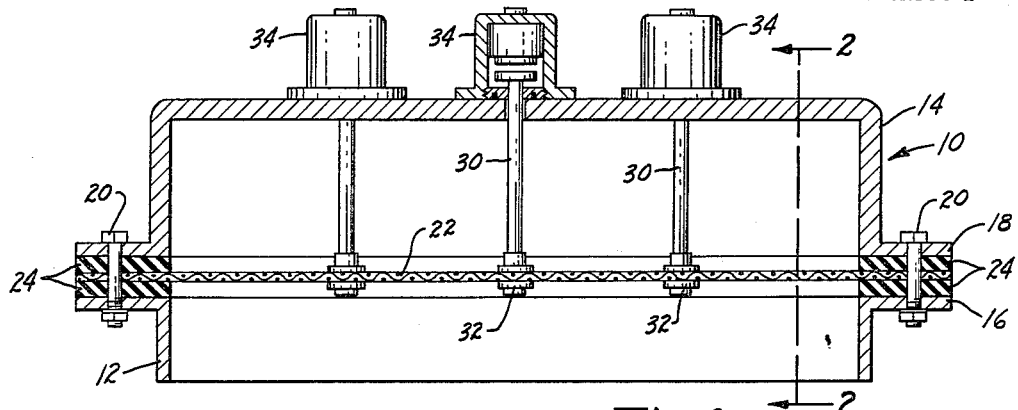
Figure 2:
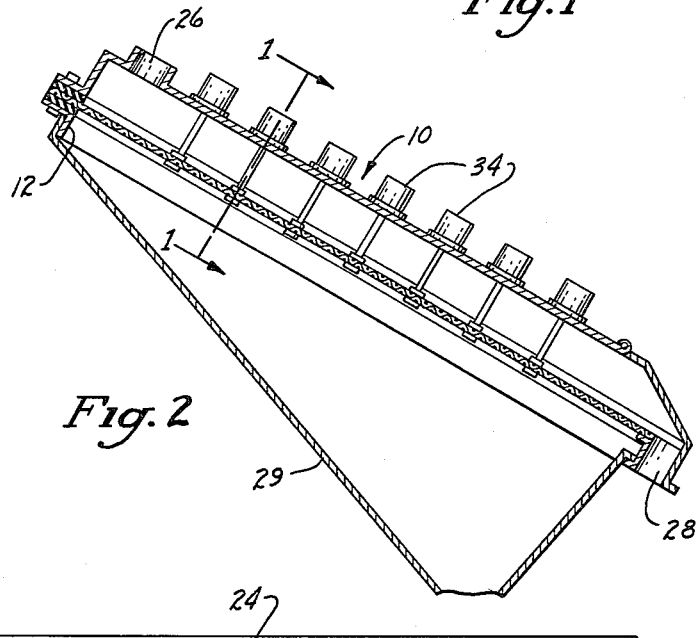
Figure 3:
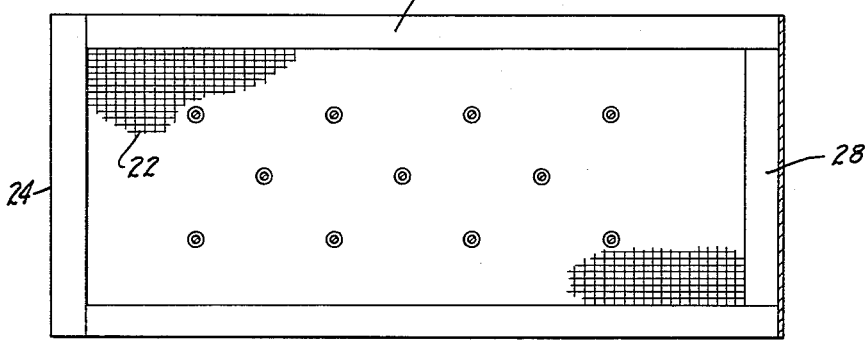
Figure 4:
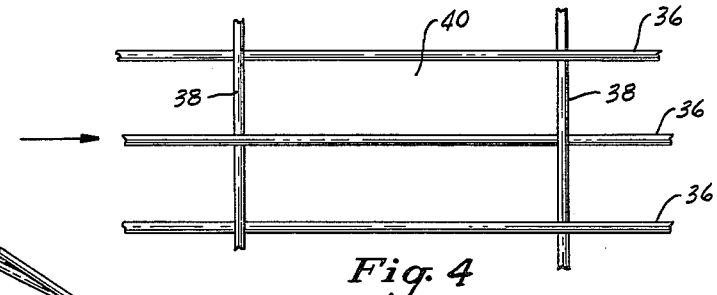
Figure 5:
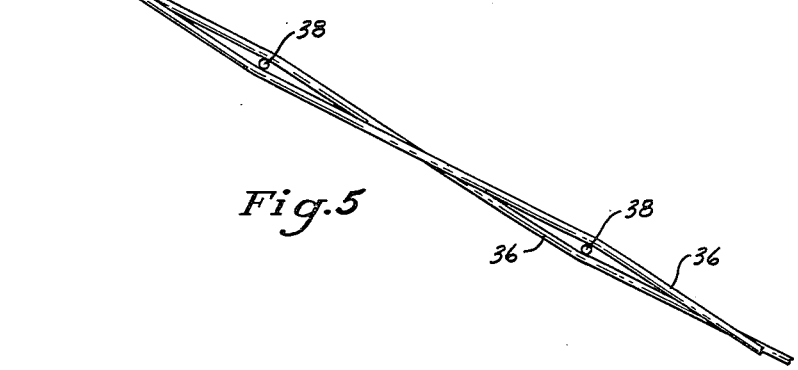
Figure 6:
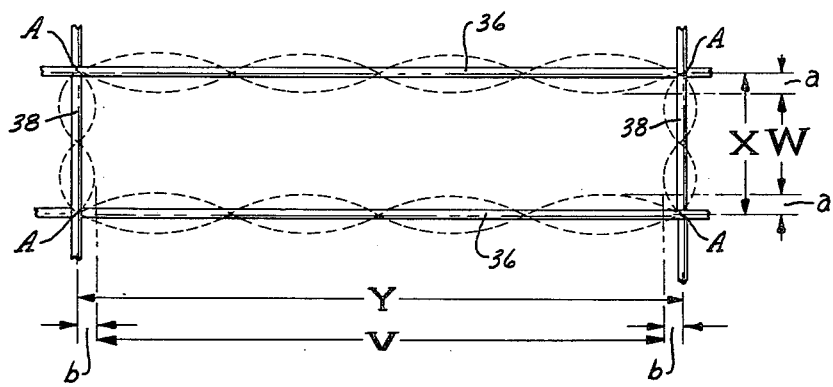

Other objects will appear from time to time in the ensuing specification and drawings in which:

FIGURE 1 is a section along line 1—1 of FIGURE 2;
FIGURE 2 is a section along line 2—2 of FIGURE 1;
FIGURE 3 is a plan view of the screen deck with the superstructure removed;
FIGURE 4 is a plan view, on an enlarged scale, of a portion of the screen deck;
FIGURE 5 is a side view of a portion of the screen deck shown in FIGURE 4; and
FIGURE 6 is an enlarged plan view of one opening in the screen deck operated in accordance with this method.

In FIGURES 1, 2 and 3 the screen device is shown as including a frame, indicated generally at 10, made up of but not limited to a base 12 with a bridging member 14, both of which may have outstanding flanges as at 16 and 18 to be secured together by bolts 20 or the like. A screening medium or screening element or mesh 22 is disposed across the frame and held between the flanges by rubber or felt pads 24. As shown in FIGURE 2, the bridging member 14 may have a suitable inlet 26 to supply material to be screened to one end of the screen or deck. A suitable outlet 28 may be provided in the base at the other end for material that does not pass through the mesh. The deck or frame is disposed at an angle, to be explained hereinafter, such as shown in FIGURE 2, so that the material to be separated will move down the screening medium from the inlet to the outlet. A collecting hopper 29 may be disposed under the mesh in a conventional manner.

To vibrate the screen, rods 30 or the like may be connected directly at 32 to the screening medium 22 at spaced intervals. While the particular details of the mechanism 32 for connecting each rod to the screening medium is not, of itself, important to this invention, it should be known that resilient springlike distributor elements are disposed on opposite sides of the screening medium and each rod projects through a suitable aperture or hole in the medium and the spring distributors and is secured so that vibrations from the rods are transmitted to the screening medium through resilient disks or distributors and not directly. For the details of this, reference is made to copending application Serial No. 405,947, filed January 25, 1954, now U. S. Patent No. 2,880,871, patented April 7, 1959.

Each rod is vibrated vertically or at right angles to the general plane of the screening medium by an ascillating head 34 which is rigidly mounted or otherwise secured to the bridging member 14. The details of this ocsillating or impeller head are not important to this invention, but it should be understood that these heads impart oscillatory vibrations to the rods and, therefore, to the screen, at a frequency of a high magnitude, for example 100 oscillations per second. Additionally, the heads are constructed so that superposed harmonics will be imposed on the screen to effect a screening action composed of a plurality of somewhat independent screening areas disposed around each rod. Very high frequency oscillations or vibrations emanate, from the point of attachment of each rod to the screen or medium and radiate therefrom in concentric circles. The oscillations from each rod, thus radiated, intersect the radiating high frequency oscillations from the immediately adjacent rods in zones of interference where a high turbulence will be set up in the material. Again, reference is made to copending application Serial No. 405,947, filed January 25, 1954, now U.S. Patent No. 2,880,871, patented April 7, 1959.

The particular screening medium used is shown as made up of a plurality of longitudinally disposed wires 36 which may be laterally spaced at uniform intervals and a plurality of laterally disposed wires 38 which may be also uniformly spaced longitudinally, thereby providing a screen deck composed of a plurality of laterally and longitudinally disposed interwoven and intersecting wires, one passing alternately over and under the others, to define what may be considered rectangular screen openings 40. The long dimension of such openings is disposed generally in the direction of material movement, which is indicated by the arrow in FIGURE 4. The angle of inclination of the screen deck, such as shown in FIGURES 2 or 5, may be adjusted in any desired manner.

FIGURE 6 is an enlarged view of one such opening as defined by two adjacent longitudinally disposed wires 36 and two adjacent laterally disposed wires 38.

A screening mesh or medium of this type is not per se new and it is conventional to clamp it on all four sides in the frame 10 to a suitable degree of tension and to thereafter vibrate the frame in accordance with known practice. One of the problems that occurs, particularly in wet screening, is that the wet material to be screened will gum or blind or bind up in the openings of the screen and the screen will require manual cleaning before screening can be started again. The farther apart the adjacent lateral and longitudinal wires actually are, the less tendency of the screening medium to blind or clog. But the spacing of adjacent lateral and longitudinal wires must be such as to effect the desired separation which is governed by the particular material to be separated and the particle size separation desired.

The vibrating heads 34 apply a vibratory movement to the screen at a predetermined frequency and amplitude.

The lateral and longitudinal wires, such as shown in FIGURE 6, intersect and contact each other at points designated A. The free length of each lateral wire 38 between adjacent points of contact A is designated X, while the free length of each longitudinal wire 36 between adjacent points A of contact is designated Y. The tension applied to the screening medium is related to this free length so that in accordance with the wire size, the free length, and the frequency and amplitude of the oscillations applied to the screening medium by the vibrating heads 34, a resonant condition will be set up in the free length of the wires said length being a multiple or submultiple of the wave length involved. This will cause each individual free length to vibrate between its adjacent points of contact A in all directions, both at right angles to the general plane of the screen deck as well as within the plane of the screen deck or screening medium. In broken lines in FIGURE 6, the oscillatory or vibratory movements of the free length of both the lateral and longitudinal wires have been superimposed on them. By vibrating in the same general plane as the plane of the screening medium, the waves or ripples tend to effectively close up the openings 40, and such reduction will amount to twice the amplitude of such vibration. For example, the amplitude of this vibration has been indicated at $a$ for the longitudinal wires 36 and at $b$ for the lateral wires 38. Thus the effective clearance between vibrating adjacent longitudinal wires 36 will be the actual clearance X minus twice the amplitude $a$ which is designated at W. The effective clearance between adjacent lateral wires 38 will be equal to the actual clearance Y minus twice the amplitude $b$ which is designated at V.

Therefore, the dimensions of each of the effective openings will be V and W, whereas the dimensions of the actual openings will be X and Y. The desired separation will be determined according to the V and W dimensions, but the blinding or clogging tendency will be established by the X and Y dimensions. In short, the clogging tendency of the screen may be reduced by opening up the openings or spacing the adjacent wires farther apart, but at the same time the effectiveness of the separation will remain the same. The fact that the wires are in constant motion, each within itself, causes them to actually lift the larger particles from the opening and also to free the smaller ones so they may pass on through the screen, thereby establishing the exact size of separation and also allowing the screen to remain free of material.

The use, operation and function of the invention are as follows:

A screen with both lateral and longitudinally disposed wires which intersect and contact each other in an overlapping pattern is well known. It is also known to vibrate such a screen as material is passed over it to effect separation. But such a screen will seriously clog or blind, particularly when working with moist or damp material.

In this invention the amplitude and frequency of the vibrations imparted directly to the screening medium, in the manner such as shown in FIGURES 1, 2 and 3, should be related to the tension initially applied to the screening medium so that a resonant condition will be set up in the free length of the individual wires between adjacent points of contact with the intersecting wires. The size and free length of the wires are important. The tension applied to the screening medium is important. The frequency and amplitude of the vibration from the outside source are important. If these factors are adjusted and coordinated, the resonant condition described above may be set up in the individual free length of the wires so that the effective opening between adjacent wires may remain the same even though the wires have been spaced apart a distance greater than that actually dictated by the separation desired. The actual opening defined by the wires, which controls or governs clogging or blinding, may be larger than the effective opening which governs separation. Thus for the same separation, the blinding or clogging tendency will be greatly reduced.

While the preferred form and several variations of the invention have been suggested, it should be understood that suitable additional modifications, changes, alterations and substitutions may be made without departing from the invention's fundamental theme. It is, therefore, wished that the invention be unrestricted, except as by the appended claims.

I claim:

1. A method of constructing and operating a screening device having a screen deck with a frame and a screening medium consisting of a plurality of generally parallel lateral wires interwoven with a plurality of generally parallel longitudinal wires therein intersecting and contacting each other at spaced intervals to define generally rectangular screen openings, including the steps of spacing the lateral wires longitudinally and the longitudinal wires laterally to provide a predetermined lateral and longitudinal free length of each wire between adjacent points of contact, tensioning both the lateral and longitudinal wires a predetermined amount respectively relative to the size and free length of the wires, and producing a resonant condition in the tensioned free length of the wire between adjacent points of contact by vibrating the screening medium at a frequency relative to the tensioning, size and free length of the wires to vibrate both at right angles to and in the plane of the screening medium.

2. The method of claim 1 in that the screening device is to be used to screen a particular finely divided material according to a desired particle size separation, and further characterized in that the wires are spaced and the screening medium is vibrated at a frequency that produces an amplitude in the vibrating wires such that the vibratory clearance between adjacent wires will effect the desired particle size separation.

3. The method of claim 1 further characterized by and including the step of spacing the lateral wires substantially farther apart than the longitudinal wires.

4. The method of claim 1 further characterized by and including the step of spacing the wires so that the lateral and longitudinal free lengths will be harmonics of each other.

5. A method of constructing and operating a screening device having a screen deck with a frame and a screening medium consisting of a plurality of generally parallel lateral and longitudinal wires therein intersecting and contacting each other at spaced intervals to define generally rectangular screen openings, including the steps of spacing the lateral wires longitudinally and the longitudinal wires laterally to provide a predetermined lateral and longitudinal free length of each wire between adjacent points of contact, tensioning both wires a predetermined amount respectively relative to the size and free length of the wires, and producing a resonant condition in the tensioned free length of the wire between adjacent points of contact by vibrating the screening medium at a frequency relative to the tensioning, size and free length of the wires to vibrate both at right angles to and in the plane of the screening medium.

6. The method of claim 5 further characterized by and including the step of spacing the lateral wires substantially farther apart than the longitudinal wires.

7. A method of constructing and operating a screening mechanism having a screening medium consisting of a plurality of generally parallel lateral wires and a plurality of generally parallel longitudinal wires intersecting and contacting each other at spaced intervals to define a generally rectangular screen opening, including the steps of directly vibrating the screening medium in a direction generally at right angles to the plane thereof, and setting the frequency of the vibration, relative to the lateral and longitudinal free length of each wire between adjacent points of contact and the tension applied thereto, to produce a resonant condition in the tensioned free length of the wires between adjacent points of contact to cause them to vibrate both at right angles to and in the plane of the screening medium.

References Cited in the file of this patent

UNITED STATES PATENTS

| | | |
|---|---|---|
| 1,455,785 | Hackstaff | May 22, 1923 |
| 1,685,940 | Deister | Oct. 2, 1928 |
| 2,247,271 | Barlow | June 24, 1941 |
| 2,799,398 | Heymann | July 16, 1957 |
| 2,839,193 | Bruderlein | June 17, 1958 |
| 2,880,871 | Bruninghaus | Apr. 7, 1959 |
| 2,907,404 | Mare | Oct. 6, 1959 |

OTHER REFERENCES

Handbook of Mineral Dressing, by Aurthur F. Taggart, published by John Wiley and Sons, Incorporated, New York, N.Y., 1945, sixth printing, March 1946, pages 7–12.